US012720665B2

(12) United States Patent
Kumlin et al.

(10) Patent No.: US 12,720,665 B2
(45) Date of Patent: Aug. 25, 2026

(54) PROTON ENERGY DEGRADER DEVICES AND METHODS OF USING SAME

(71) Applicant: ARTMS Inc., Burnaby (CA)

(72) Inventors: Joel Kumlin, Burnaby (CA); Maurice G. Dodd, Chilliwack (CA); Brian Hook, Vancouver (CA)

(73) Assignee: ARTMS Inc., Burnaby (CA)

( * ) Notice: Subject to any disclaimer, the term of this patent is extended or adjusted under 35 U.S.C. 154(b) by 306 days.

(21) Appl. No.: 18/288,032

(22) PCT Filed: Apr. 21, 2022

(86) PCT No.: PCT/CA2022/050607
§ 371 (c)(1),
(2) Date: Oct. 23, 2023

(87) PCT Pub. No.: WO2022/221949
PCT Pub. Date: Oct. 27, 2022

(65) Prior Publication Data
US 2024/0215147 A1 Jun. 27, 2024

Related U.S. Application Data

(60) Provisional application No. 63/178,817, filed on Apr. 23, 2021.

(51) Int. Cl.
*H05H 7/12* (2006.01)
*G21K 5/00* (2006.01)
*H05H 13/00* (2006.01)

(52) U.S. Cl.
CPC ................ *H05H 7/12* (2013.01); *G21K 5/00* (2013.01); *H05H 2007/125* (2013.01); *H05H 13/005* (2013.01)

(58) Field of Classification Search
CPC .. G21K 1/10; G21K 5/00; H05H 7/12; H05H 13/005; H05H 2007/004; H05H 2007/125
See application file for complete search history.

(56) References Cited

U.S. PATENT DOCUMENTS 4,122,967 A * 10/1978 Rohrich .................. H01J 31/50 313/527
5,033,075 A * 7/1991 DeMone .................. G21K 1/10 378/158
(Continued)

FOREIGN PATENT DOCUMENTS

JP H0952162 A 2/1997
JP 2012009569 A 1/2013
(Continued)

OTHER PUBLICATIONS

Engle et al., "Flexible, durable proton energy degraders for the GE PETtrace", AIP Conference Proceedings, Dec. 20, 2012 (Dec. 20, 2012), vol. 1509, No. 1, pp. 25-29, The entire document.
(Continued)

*Primary Examiner* — Wyatt A Stoffa
(74) *Attorney, Agent, or Firm* — Thomas | Horstemeyer LLP

(57) ABSTRACT

This disclosure relates to a proton beam degrader and a cooling assembly. The proton beam degrader includes a degrader foil that is positioned within a path of a particle beam directed to strike a target. The degrader can include a plurality of fins positioned outside of a conduit within which the degrader foil is positioned to transfer heat away from the degrader foil and into a cooling channel formed in conjunction with the cooling assembly. The degrader foil can have chamfered corners to further improve heat transfer. The degrader foil can include at least one aperture to aid in forming a vacuum condition across the degrader foil. In
(Continued)

some examples, where a target cannot operate in a vacuum environment, the degrader can include a degrader foil devoid of any apertures.

27 Claims, 9 Drawing Sheets

(56) References Cited

U.S. PATENT DOCUMENTS

| | | | | |
|---|---|---|---|---|
| 5,235,239 | A * | 8/1993 | Jacob | G21K 1/10 313/363.1 |
| 5,416,440 | A * | 5/1995 | Lyons | H01J 33/04 315/502 |
| 5,898,261 | A * | 4/1999 | Barker | H01J 33/04 313/46 |
| 6,440,527 | B2 * | 8/2002 | Prins | G21K 1/10 428/116 |
| 8,249,211 | B2 * | 8/2012 | Buckley | G21K 5/08 376/195 |
| 8,339,024 | B2 * | 12/2012 | Walther | G21K 5/00 313/361.1 |
| 9,330,803 | B2 * | 5/2016 | Sweat | G21K 5/04 |
| 9,789,341 | B2 * | 10/2017 | Abbasi | G21K 1/10 |
| 12,033,768 | B2 * | 7/2024 | Kiselev | H05H 6/00 |
| 2006/0291607 | A1 | 12/2006 | Hong et al. | |
| 2010/0294655 | A1 | 11/2010 | Hong et al. | |
| 2012/0161671 | A1 * | 6/2012 | Eriksson | H05H 13/005 315/501 |
| 2013/0287164 | A1 * | 10/2013 | Rogers | G01N 23/046 378/156 |
| 2014/0264065 | A1 * | 9/2014 | Cruz | A61N 5/10 250/492.3 |
| 2015/0053640 | A1 * | 2/2015 | Kostamo | B82Y 30/00 156/108 |
| 2015/0090894 | A1 * | 4/2015 | Zwart | H05H 13/02 250/396 ML |
| 2015/0119627 | A1 * | 4/2015 | Sweat | A61N 5/1042 600/1 |
| 2016/0326062 | A1 * | 11/2016 | Furuya | C04B 37/001 |
| 2017/0062087 | A1 * | 3/2017 | Abbasi | G21K 1/10 |
| 2018/0043181 | A1 * | 2/2018 | Zwart | A61N 5/1043 |
| 2018/0043188 | A1 * | 2/2018 | Abbasi | A61N 5/1077 |
| 2020/0029421 | A1 * | 1/2020 | De Neuter | H05H 7/10 |
| 2020/0043621 | A1 * | 2/2020 | Comor | G21G 1/04 |
| 2022/0377872 | A1 * | 11/2022 | Gelbart | H05H 6/00 |
| 2023/0070813 | A1 * | 3/2023 | Guerin | H05H 6/00 |

FOREIGN PATENT DOCUMENTS

| | | | |
|---|---|---|---|
| JP | 2016164182 | A | 9/2016 |
| JP | 2018076328 | A | 4/2020 |
| KR | 20000019823 | A | 7/2001 |

OTHER PUBLICATIONS

Engle et al., "Flexible, durable proton energy degraders for the GE PETrace", AIP Conference Proceedings, vol. 1509, No. 1, pp. 25-29, Dec. 20, 2012 (Dec. 20, 2012).

Office Action Received for CA 3217485.

JP Office Action Received for Application No. 2023-056446 (original).

JP Office Action Received for Application No. 2023-056446 (machine translation).

* cited by examiner

SECTION A–A

PROTON ENERGY DEGRADER DEVICES AND METHODS OF USING SAME

This Application is the 35 U.S.C. § 371 national stage application of PCT Application No. PCT/CA2022/050607, filed Apr. 21, 2022, where the PCT claims priority to, and the benefit of, U.S. Provisional Application entitled "PROTON ENERGY DEGRADER DEVICES AND METHODS OF USING SAME" having Ser. No. 63/178,817, filed Apr. 23, 2021, both of which are herein incorporated by reference in their entireties.

TECHNICAL FIELD

This disclosure relates to proton energy degraders, an in particular to degraders with cooling.

BACKGROUND

Particle accelerators can accelerate particles to high velocities. Protons are one of many particles that can be accelerated by particle accelerators. The accelerated protons can be directed to a target material to cause nuclear reactions in the target, resulting in the production of desired radioisotopes or radionuclides. The types of radioisotopes and radionuclides produced can be a function of the energy of the protons bombarding the target. To produce the desired radioisotopes or radionuclides, the energy of the protons incident on the target must be at a corresponding energy level. However, most accelerators accelerate particles to fixed energy levels, which may not be readily adjustable. To reduce the energy of the protons incident on the target, a degrader can be positioned in the path of the protons to absorb a certain amount of energy from the protons such that the energy of the protons incident on the target is at the desired level.

Despite advances in research directed to improved proton beam energy degraders, there is still a scarcity of devices that provide providing sufficient cooling in order to withstand some of the highest beam powers. These needs and other needs are satisfied by the present disclosure.

SUMMARY

In accordance with the purpose(s) of the disclosure, as embodied and broadly described herein, the disclosure, in one aspect, relates to proton beam degrader assemblies that includes a proton beam degrader and a cooling assembly. The proton beam degrader includes a degrader foil that is positioned within a path of a particle beam directed to strike a target. The degrader can include a plurality of fins positioned outside of a conduit within which the degrader foil is positioned to transfer heat away from the degrader foil and into a cooling channel formed in conjunction with the cooling assembly. The degrader foil can have chamfered corners to further improve heat transfer. The degrader foil can include at least one aperture to aid in forming a vacuum condition across the degrader foil. In some examples, where a target cannot operate in a vacuum environment, the degrader can include a degrader foil devoid of any apertures. This abstract is intended as a scanning tool for purposes of searching in the particular art and is not intended to be limiting of the present disclosure.

Disclosed are proton beam degraders for positioning between a particle beam source and a target material, comprising: a conduit having a first opening and a second opening, the conduit providing a path for a particle beam to enter through the first opening and exit through the second opening; a degrader foil structurally integral to the conduit positioned on the inner surface of the conduit and in an expected path of the particle beam; a cooling path zone on an outer surface of the conduit, the cooling path zone configured to exposed to a coolant fluid, wherein the degrader foil is positioned between extents on the inner surface that are diametrically opposite of extents of the cooling path zone on the outer surface.

Also disclosed are proton beam degraders for positioning between a particle beam source and a target material, comprising: a conduit having a first opening and a second opening, the conduit providing a path for a particle beam to enter through the first opening and exit through the second opening; a degrader foil positioned on the inner surface of the conduit and in an expected path of the particle beam, the degrader being structurally integral to the conduit; at least one chamfered corner at least one intersection of a surface of the degrader foil and the inner surface of the conduit.

Also disclosed are proton beam degrader assemblies for positioning between a particle beam source and a target material, comprising: a proton beam degrader, comprising: a conduit having a first opening and a second opening, the conduit providing a path for a particle beam to enter through the first opening and exit through the second opening; a degrader foil structurally integral to the conduit positioned on the inner surface of the conduit and in an expected path of the particle beam; and a plurality of fins extending outwards from the outer surface of the conduit, the plurality of fins positioned opposed to the position of the degrader foil; a cooling assembly, comprising: a sleeve having an inner surface enclosing the plurality of fins of the proton beam degrader, wherein at least the inner surface of the sleeve and the outer surface of the conduit of the proton beam degrader define a cooling channel; a coolant inlet in fluid communication with the cooling channel, and a coolant outlet in fluid communication with the cooling channel.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figures 1A, 1B, 1C, 1D, 1E:
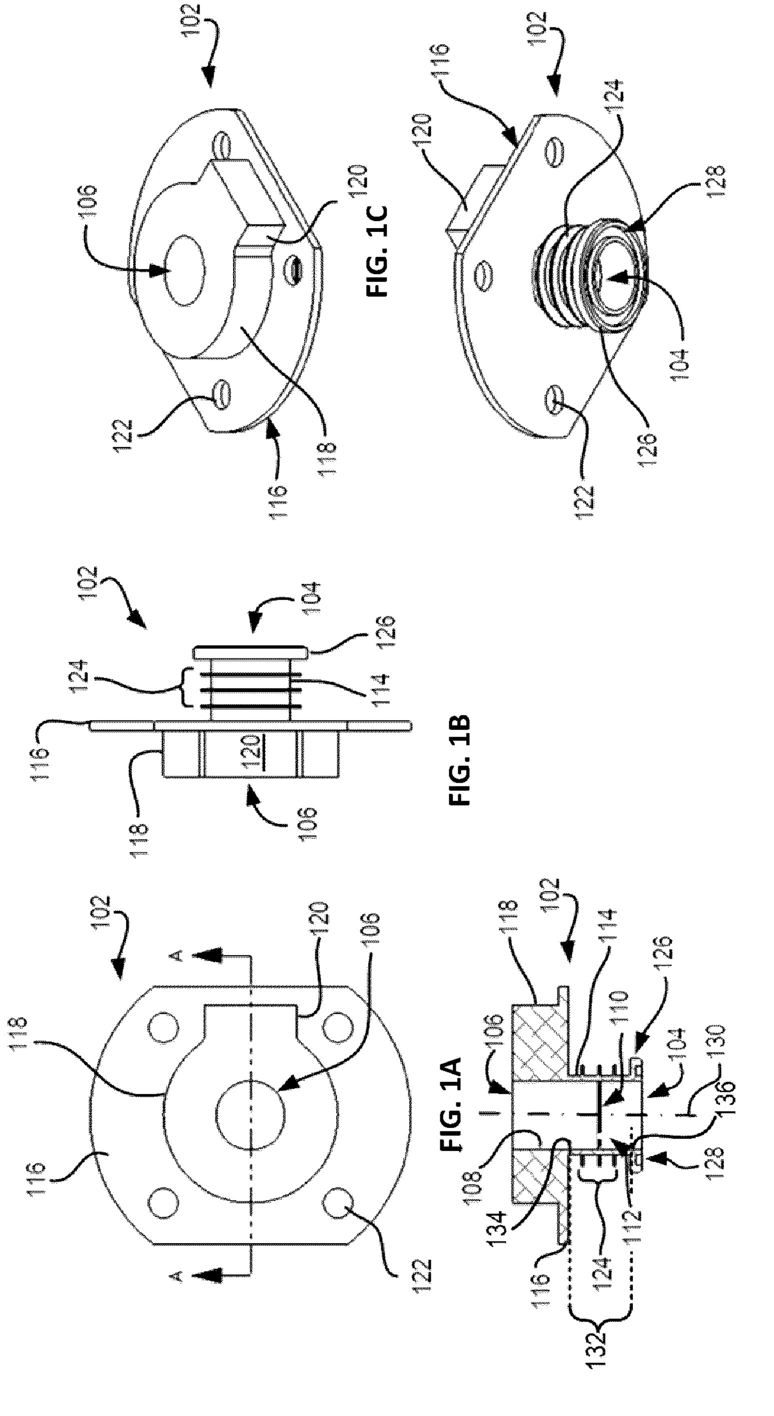
FIGS. 1A-1E show various views of a portion of a proton beam degrader.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

Like reference numbers and designations in the various drawings indicate like elements.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Prior to describing the various aspects of the present disclosure, the following definitions are provided and should be used unless otherwise indicated. Additional terms may be defined elsewhere in the present disclosure.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used herein, the term "and/or" includes any and all combinations of one or more of the associated listed items. Expressions such as "at least one of," when preceding a list of elements, modify the entire list of elements and do not modify the individual elements of the list.

As used in the specification and the appended claims, the singular forms "a," "an" and "the" include plural referents unless the context clearly dictates otherwise. Thus, for example, reference to "a proton beam degrader," "a degrader foil," or "a conduit," includes, but is not limited to, two or more such proton beam degraders, degrader foils, or conduits, and the like.

The various concepts introduced above and discussed in greater detail below may be implemented in any of numerous ways, as the described concepts are not limited to any particular manner of implementation. Examples of specific implementations and applications are provided primarily for illustrative purposes.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

Degraders can be positioned in the path of accelerated particles (also referred to as a particle beam) incident on a target to absorb a certain amount of energy from the particle beam. This causes the particle beam to be incident on the target at reduced energy. The amount of energy that needs to be absorbed by the degrader is based on the energy of the particle beam generated by the accelerator and the desired energy of the particle beam incident on the target for producing the desired radioisotopes or radionuclides. The energy absorbed by the degraders can cause the temperature of the degraders to rise. As a result, the degrader can be coupled with cooling channels that remove the heat energy from the degrader to maintain the temperature of the degrader within a safe range of temperatures. As discussed further below, the degrader structure can be designed to include elements that improve the rate at which heat can be transferred away from the degrader, which typically is a metal foil. By improving the rate at which heat can be transferred away from the degrader, the reliability and the life of the degrader can be improved.

FIGS. 1A-1E show various views of a portion of a proton beam degrader 100 (also referred to as "a first proton beam degrader 100"). In particular, FIG. 1A shows a top view of a conduit 102 shown in FIG. 1C, FIG. 1B shows a side view of the conduit 102 shown in FIG. 1C, FIG. 1D shows a cross-sectional view of conduit shown in FIG. 1C, and FIG. 1E shows another isometric view of the conduit 102 shown in FIG. 1C. The conduit 102 forms a portion of a proton beam degrader (discussed further below). The conduit 102 has a first opening 104 and a second opening 106. The conduit 102 provides a path for a particle beam such as, for example, a proton beam to enter through the first opening and exit through the second opening. The conduit 102 has a substantially circular cross-section. In some other examples, the conduit 102 can have cross-sectional shapes that are elliptical, rectangular, or polygonal (regular or irregular). The conduit 102 can include an internal surface 108. The internal diameter of the conduit 102, measured with respect to the internal surface 108, can be selected to be wider than the width of the particle beam passing therethrough. In some examples, the internal diameter of the conduit 102 can be twice as wide as the width of the particle beam. In some examples, the conduit 102 can have an internal diameter of about 10 mm to about 24 mm.

The conduit 102 includes a degrader foil 110 that is structurally integral to the conduit 102. In particular, the degrader foil 110 can be formed by machining a single block of a degrader material to form the conduit 102 as well as the degrader foil 110. As an example, a boring tool can be inserted from one end of the degrader material block to form the first opening 104. Similarly, the boring tool can be inserted from another end of the block to form the second opening 106. The boring tools are guided such that they leave behind material that forms the degrader foil 110. It should be noted that the boring tool is only an example tool to form the first opening 104, the second opening 106 and the degrader foil 110, and that any tool that can form cavities with desired depths within the block of degrader material can be utilized. The proton beam degrader 100 may also be formed using a casting process, where cast of the desired shape of the proton beam degrader 100 is formed, and the desired metal is poured into the cast. After the metal solidifies, the cast can be removed. Regardless of the process used to form the proton beam degrader 100, the degrader foil 110 is structurally integral to the conduit 102. In some examples, the proton beam degrader 100 can be formed using at least one of carbon, aluminum, tantalum, niobium, molybdenum, or a refractory material. Refractory materials can include, for example, iridium, tungsten, titanium-zirconium-molybdenum alloys, and the above-mentioned metals such as tantalum, and tantalum alloys.

The thickness of the degrader foil 110 can be a function of magnitude of desired energy degradation to be provided by the degrader foil 110 to the energy of the particle beam and the degrader material. As an example, with aluminum as the degrader material, a thickness of about 0.5 mm to about 0.55 mm can degrade the energy of a proton beam by about 3 MeV to about 3.5 MeV if the incident proton beam energy is about 16 MeV. In another example, the thickness of the degrader foil 110 can be selected such that the degrader foil 110 degrades the energy of the incident proton beam to 13 MeV or less. In some such examples, the incident proton beam can have an incident energy of 16 MeV to 18 MeV. Other degrader materials can have different thicknesses for the same desired magnitude of energy degradation. As an example, with an aluminum degrader foil, the thickness of the degrader foil 110 can have a value between 0.1 mm and 2.2 mm or between 0.4 mm and 0.6 mm. The degrader foil 110 can be devoid of any solder joints or other attachments that attach the degrader foil 110 to the internal surface 108 of the conduit 102. That is, the degrader foil 110 may not be separately formed and then attached to the conduit 102. Having the degrader foil 110 formed structurally integral to the conduit 102 improves heat conduction away from the degrader foil 110 and into the conduit 102. The improved heat conduction, in turn, improves the reliability of the degrader foil 110 as well as the life of the degrader foil 110. The degrader foil 110 can be positioned substantially normal to the direction of the proton beam through the conduit 102. In some such examples, where the longitudinal axis 130 of the conduit 102 is substantially parallel to the direction of the proton beam, the degrader foil 110 can be substantially normal to the internal surface 108 of the conduit 102. In some other examples, the degrader foil 110 may be positioned at a non-perpendicular angle with respect to the direction of the proton beam. For example, the degrader foil 110 can form a non-perpendicular angle with the internal surface 108 of the conduit 102. Positioning the degrader foil 110 obliquely with respect to the direction of the proton beam can cause the proton beam to spread the beam power over a larger surface area of the degrader foil 110. Spreading the beam power over a larger surface area can also advantageously spread the temperature gradient on the surface of the degrader foil 110, thereby potentially reducing the peak temperature on the surface of the degrader foil 110.

The degrader foil 110 can define at least one aperture that allows fluid communication therethrough. For example, the degrader foil 110 can define an aperture 112. The aperture can aid in maintaining a low pressure or a vacuum condition on both sides of the degrader foil 110. The aperture 112 can be positioned off-center of the degrader foil 110. For example, the aperture 112 can be positioned around the periphery of the degrader foil 110. In this manner, the aperture 112 can be outside of the area of the degrader foil 110 on which the particle beam is expected to be incident. In some examples, the degrader foil 110 can define more than one aperture that can be distributed around the periphery of the degrader foil 110. The diameter of the aperture 112 can be small to reduce the impact on the structural stability of the degrader foil 110. In some examples, the diameter of the aperture 112 can be about 0.1 mm to about 0.9 mm, or about 0.1 mm to about 1 mm, or about 0.1 mm to about 1.2 mm, or about 0.1 mm to about 1.5 mm, or about 0.1 mm to about 2 mm, or about 0.1 mm to about 2.5 mm, or about 0.1 mm to about 3 mm.

The conduit 102 has an outer surface 114, which extends over at least a portion of the length of the conduit 102. The length of the conduit 102 can refer to a dimension of the conduit 102 measured along a longitudinal axis 130 that extends between the first opening 104 and the second opening 106. A target side flange 116 (also referred as a sleeve side flange) extends outwardly from the outer surface 114 of the conduit 102. The target side flange 116 is positioned proximate the second opening 106. The conduit 102 also includes a key structure 118 that allows coupling the target side flange 116 to a target housing. The shape of the key structure 118 can be such that it mates with a complementary structure in the target housing. In other words, the key structure 118 can be inserted into a complementary opening in the target housing. The shape of the key structure 118 can be asymmetric. This can allow securing the conduit 102 to the target housing and reduce the risk of rotational movement along the longitudinal axis 130 of the conduit 102. As an example, the key structure 118 includes a projection 120 that extends outwardly from the key structure 118 in a direction that is normal to the longitudinal axis 130 of the conduit 102. Of course, other forms of shapes and structures can be utilized (such as, for example, dowels, pins, etc.,) to form the key structure 118. In some examples, the conduit 102 may not include the key structure 118, and instead rely on coupling between the target side flange 116 and another structure on the target housing to secure the conduit 102 to the target housing. The key structure 118 can surround the periphery of the second opening 106 and can be flush with the second opening 106. In some examples, the key structure 118 may not extend to the second opening 106. That is, at least a portion of the outer surface 114 may be exposed between the key structure 118 and the edge of the conduit 102 at the second opening 106. In some examples, the key structure 118 may not be flush with the target side flange 116. That is, at least a portion of the outer surface 114 may be exposed between the target side flange 116 and the key structure 118.

The target side flange 116 may also include one or more holes 122 that can accommodate fasteners such as, for example, bolts, screws, dowels, nails, pins, etc., to securely adhere the target side flange 116 to the target housing, to a sleeve (discussed further below), or both. In some examples, the target side flange 116 may be devoid of the one or more holes 122, and may include alternative means such as, for example, clamps, to couple the target side flange 116 to the target housing, the sleeve, or both.

The conduit 102 can include a plurality of fins 124 that extend outwardly from the outer surface 114 of the conduit 102. The fins 124 can provide additional surface area for heat dissipation from the degrader foil 110. While FIGS. 1A-1E show that the fins 124 include three individual fins, this is only an example, and that the number of fins can vary between 2 fins to about 10 fins. The fins 124 can extend substantially normally to the outer surface 114. However, in some examples, the fins 124 may have non-perpendicular angular relationship with the outer surface 114. As an example, one or more of the fins 124 may have an angle between about −30 degrees to about 30 degrees with the outer surface 114. One or more fins 124 can be continuous, that is, the one or more fins 124 can extend uniformly along the circumference of the outer surface 114. Although, one or more fins can be discontinuous while others can be continuous as shown in FIGS. 1A-1E. In some examples, at least one of the fins 124 can have curved surfaces as opposed to the flat surfaces shown in FIGS. 1A-1E. The curved surfaces can increase the surface area of the fins 124, thereby increasing heat dissipation. The various shapes of the fins 124 discussed above can increase turbulence of the cooling fluid when the cooling fluid passes over the fins 124. The increase in turbulence, in turn, can improve the rate of heat transfer between the fins 124 and the cooling fluid.

The fins 124 can be positioned on the outer surface 114 opposite the position of the degrader foil 110 on the internal surface 108. This allows to increase the proportion of the heat dissipated by the fins to be from the heat generated by the degrader foil 110. In some implementations, the fins 124 can be positioned such that at least one fin lies on either side of the degrader foil 110 along the longitudinal axis 130 of the conduit 102. In some examples, a span or length of the fins 124 can be based on a distance, along the longitudinal axis 130 of the conduit 102, between the two farthest fins. In some such examples, the fins 124 can be positioned such that the center of the length is aligned with the degrader foil 110. In other words, a plane of the degrader foil 110 bisects the length of the fins 124.

The conduit 102 includes a beam source side flange 126 that extends outwardly from the outer surface 114 of the conduit 102 proximate the first opening 104. The beam source side flange 126 can engage with a lip in a sleeve (discussed below). The beam source side flange 126 can be flush with the first opening 104. In some examples, the beam source side flange 126 can be positioned such that at least a portion of the outer surface 114 is exposed between the position of the beam source side flange 126 and the edge of the conduit 102 at the first opening 104. The fins 124 can be positioned between the beam source side flange 126 and the target side flange 116. In particular, with reference to the expected direction of the particle beam through the conduit 102, the fins 124 can be positioned upstream of the beam source side flange 126, and the target side flange 116 can be positioned upstream of the fins 124. The beam source side flange 126 can include a recess 128 on a side that faces away from the fins 124. The recess 128 can run along the perimeter of the beam source side flange 126 and can accommodate an O-ring. The O-ring can press against a lip portion of a sleeve to form a seal.

The fins 124 can be positioned within a colling path zone 132 of the outer surface 114, where the cooling path zone 132 is the portion of the outer surface 114 that is exposed to a cooling fluid. In the example shown in FIG. 1D, the colling path zone 132 can extend between the target side flange 116 and the beam source side flange 126 in a direction along the longitudinal axis 130. However, in some other instances, the colling path zone 132 can extend between intermediate positions on the outer surface 114 between the target side flange 116 and the beam source side flange 126.

The degrader foil 110 can be positioned between extents on the internal surface 108 that are diametrically opposite of extents of the colling path zone 132 on the internal surface 108. For example, as shown in FIG. 1D, the extents on the internal surface 108 that are diametrically opposite the positions of the sidewalls of the target side flange 116 and the beam source side flange 126 on the outer surface 114 can be the extents between which the degrader foil 110 can be positioned on the internal surface 108. Such positioning ensures effective cooling of the degrader foil 110.

Figure 2A:
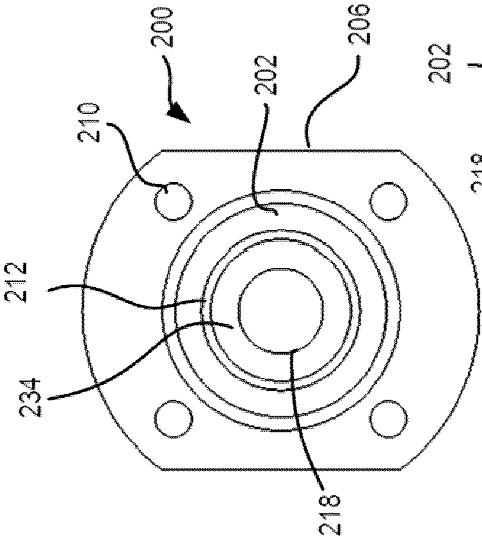
FIGS. 2A-2E show various views of a cooling assembly.
Figure 2B:
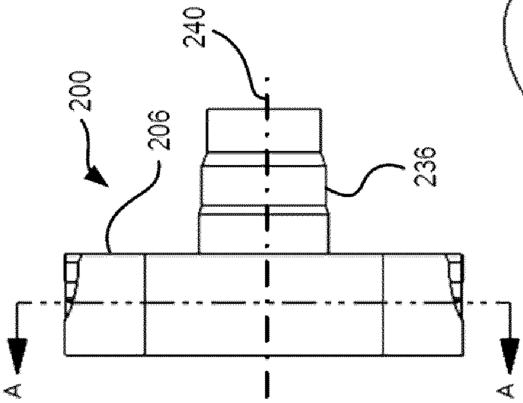
Figure 2C:
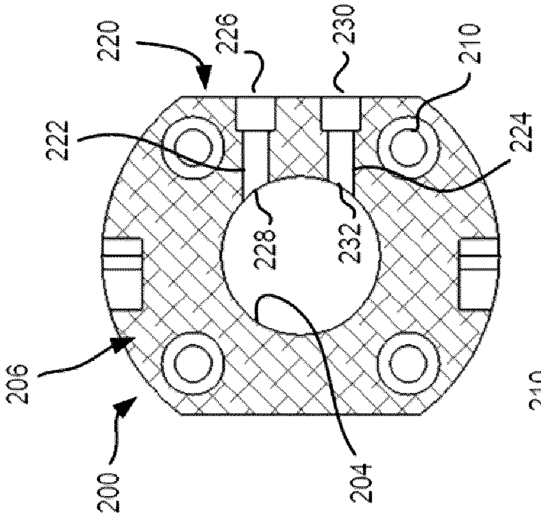
Figure 2D:
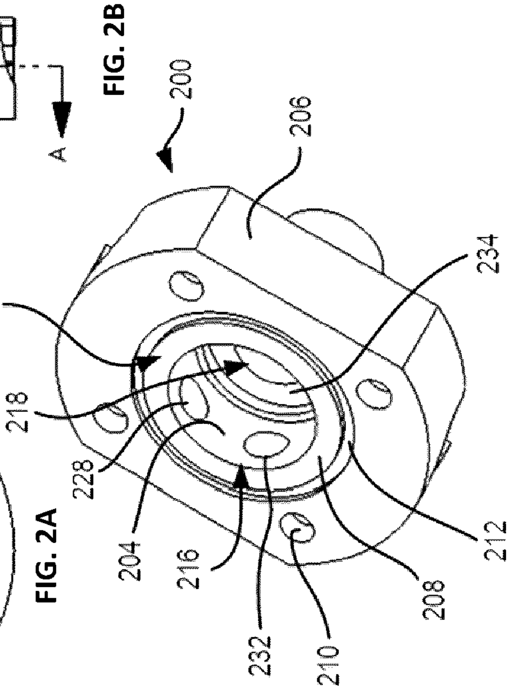
Figure 2E:
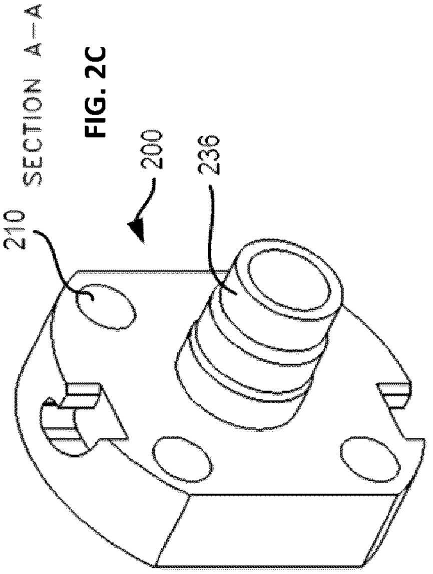

FIGS. 2A-2E show various views of a cooling assembly 200 (also referred to as "a first cooling assembly"). In particular, FIG. 2A shows a top view of the cooling assembly 200, FIG. 2B shows a side view of the cooling assembly 200, FIG. 2C shows a cross-sectional view of the cooling assembly 200 along the axis A-A shown in FIG. 2B, FIG. 2D shows a first isometric view of the cooling assembly 200, and FIG. 2E shows a second isometric view of the cooling assembly 200. The cooling assembly 200 includes a sleeve 202, which can be a cylindrical hollow structure that can accommodate the conduit 102 shown in FIGS. 1A-1E. The sleeve 202 can have an inner surface 204 that can surround the conduit 102 when the conduit 102 is mated with the cooling assembly 200. The sleeve 202 includes a degrader side opening 216 and a beam source side opening 218. The inner surface 204 can extend between the degrader side opening 216 and the beam source side opening 218. The sleeve 202 also includes a degrader side flange 206 that extends outwardly from a degrader side end 208 of the sleeve 202. The degrader side flange 206 can include at least one or more mating structures that can engage with at least one or more mating structures in the target side flange 116 of the conduit 102. For example, the degrader side flange 206 of the sleeve 202 can include one or more holes 210 that can align with the one or more holes 122 in the target side flange 116. One or more fasteners can be utilized to engage with the holes in the degrader side flange 206 of the sleeve 202 and the target side flange 116 of the conduit 102. The degrader side flange 206 can include a recess 212 on a side 214 of the degrader side flange 206 that faces away from beam source side opening 218. The recess 212 can accommodate an O-ring that can interface between the degrader side flange 206 and the target side flange 116 and form a seal.

The degrader side flange 206 can include at least one coolant inlet 222 and at least one coolant outlet 224. The coolant inlet 222 can extend between an outer coolant inlet opening 226 on the at least one side surface 220 of the degrader side flange 206 and an inner coolant inlet opening 228 on the inner surface 204 of the sleeve 202. The coolant outlet 224 can extend between an outer coolant outlet opening 230 on the at least one side surface 220 of the degrader side flange 206 and an inner coolant outlet opening 232 on the inner surface 204. The at least one coolant inlet 222 and the at least one coolant outlet 224 can carry a coolant such as, for example, water, into and out of the cooling assembly 200. While FIGS. 2A-2E show only one coolant inlet and only one coolant outlet, the number of inlets and outlets can be more than one. For example, the cooling assembly 200 can include another pair of inlet and outlet on the side surface of the degrader side flange 206 that is opposite to the side 220 to which the outer coolant inlet opening 226 and the outer coolant outlet opening 230 open.

The degrader side flange 206 also can include a lip 234 positioned at beam source side opening 218 of the sleeve 202. The lip 234 can extend inwardly from the inner surface 204 of the sleeve 202 such that the inner perimeter of the lip 234 defines the beam source side opening 218. The radial distance that the lip 234 extends inwardly can be based on the size of the beam source side flange 126 of the conduit 102 of the proton beam degrader 100 shown in FIGS. 1A-1E. When the proton beam degrader 100 is inserted into the sleeve 202, the beam source side flange 126, along with the O-ring in the recess 128 are positioned flush against the lip 234. The distance between the degrader side opening 216 and the beam source side opening 218 of the sleeve 202 can be substantially equal to the distance between the surface of the target side flange 116 facing the first opening 104 to the side of the beam source side flange 126 that faces away from the fins 124. Some tolerance can be allowed to accommodate the O-rings positioned in the recess 128 of the beam source side flange 126 and the recess 212 in the degrader side flange 206.

In some examples, the cross-sectional shape and the diameter of the space within the sleeve 202 defined by the inner surface 204 can be greater than the cross-sectional shape and diameter of the conduit 102. In some examples, the diameter of the space within the sleeve 202 defined by the inner surface 204 can be slightly greater than the outer diameter of the beam source side flange 126 or the fins 124 (whichever is greater). This is so that the proton beam degrader 100 can slide, first opening 104 side first, through the degrader side opening 216 of the sleeve 202 until the beam source side flange 126 makes contact with the lip 234, and the target side flange 116 makes contact with the degrader side flange 206.

The cooling assembly 200 further includes a connecting nozzle 236 that can connect with a particle beam source outlet. The connecting nozzle 236 can include a set of sections with progressively decreasing outer diameters to allow coupling with a complementary particle beam source outlet.

Figure 3C:
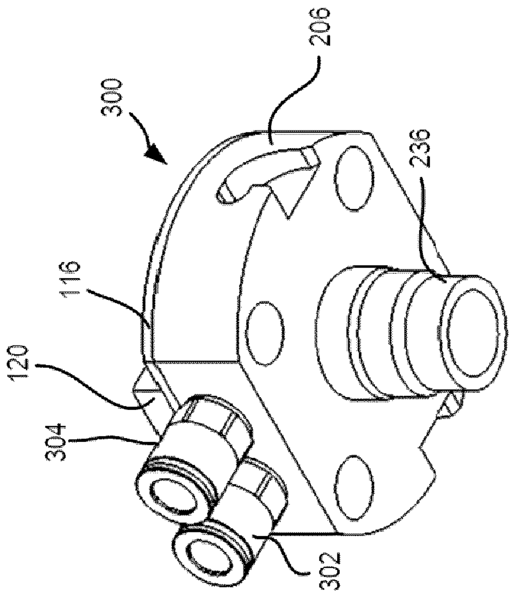
FIGS. 3A-3D show various views of a proton beam degrader assembly that includes the proton beam degrader and the cooling assembly.
Figure 3A:
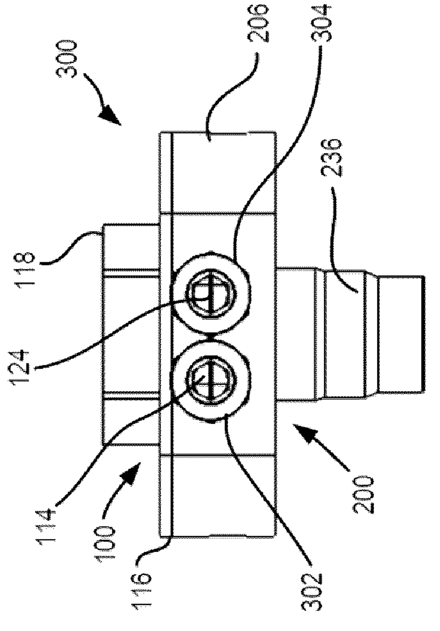
Figure 3B:
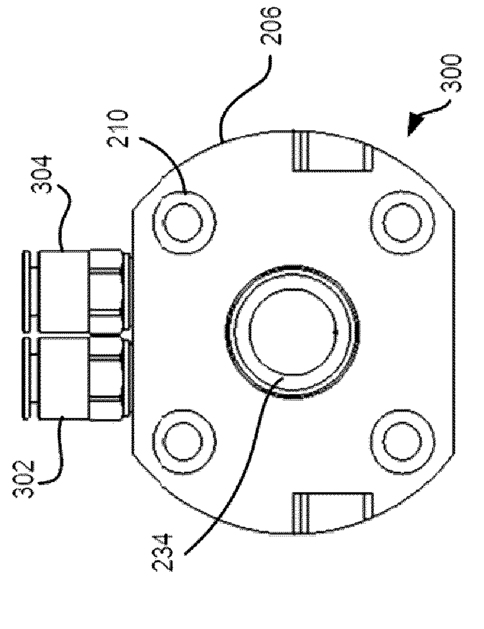
Figure 3D:
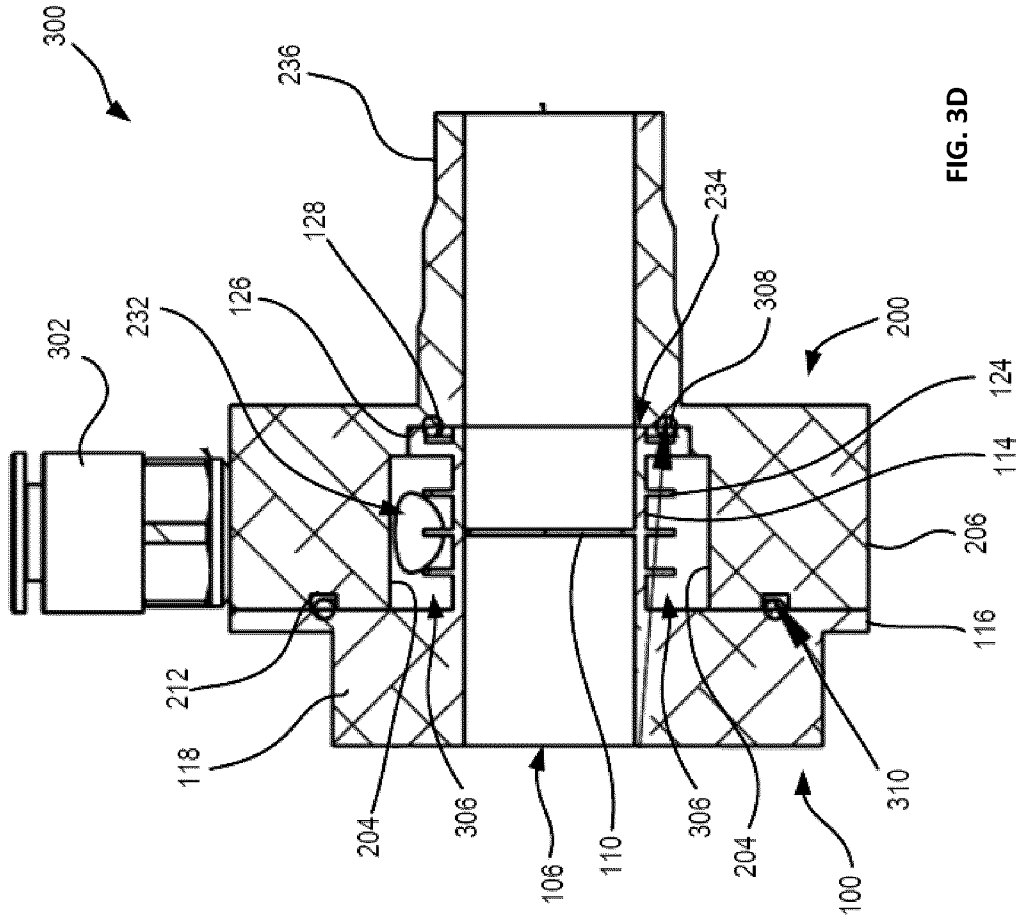

FIGS. 3A-3D show various views of a proton beam degrader assembly 300. In particular, FIG. 3A shows a side view of the proton beam degrader assembly 300, FIG. 3B shows a side view of the proton beam degrader assembly 300, FIG. 3C shows an isometric view of the proton beam degrader assembly 300, and FIG. 3D shows a cross-sectional view of the proton beam degrader assembly 300. The proton beam degrader 100 is coupled with the cooling assembly 200 such that the target side flange 116 is coupled with the degrader side flange 206. As mentioned above, the conduit 102 of the proton beam degrader 100 is inserted into the space within the sleeve 202 defined by the inner surface 204. As seen in FIG. 3A, the fins 124 and the outer surface 114 of the conduit 102 can be see through the at least one coolant inlet 222 and the at least one coolant outlet 224 of the cooling assembly 200. The proton beam degrader assembly 300 includes a coolant inlet connector 302 and a coolant outlet connector 304. The coolant inlet connector 302 can be affixed to the degrader side flange 206 at the outer coolant inlet opening 226 while the coolant outlet connector 304 is affixed to the degrader side flange 206 at the outer coolant outlet opening 230. The coolant inlet connector 302 provides fluid communication with the at least one coolant inlet 222 and the coolant outlet connector 304 provides fluid communication with the at least one coolant outlet 224. The coolant inlet connector 302 can be connected to a hose or pipe that supplies a coolant fluid to the at least one coolant inlet 222, and the coolant outlet connector 304 can be connected to a hose or pipe that receives the coolant fluid from the at least one coolant outlet 224.

FIG. 3D shows a cross-sectional view of the proton beam degrader assembly 300. The inner surface 204 of the sleeve 202 encloses the fins 124 of the proton beam degrader 100. The target side flange 116 of the proton beam degrader 100 can make contact with the degrader side flange 206 of the cooling assembly 200. In addition, the beam source side flange 126 of the proton beam degrader 100 can make contact with the lip 234 of the cooling assembly 200. The target side flange 116 presses against the degrader side flange 206 with the O-ring 310 therebetween to form a seal at the interface of the target side flange 116 and the degrader side flange 206. The O-ring 308 positioned in the recess 128 and between the beam source side flange 126 and the lip 234 forms a seal at the interface of the beam source side flange 126 and the lip 234. At least one mating structure on the degrader side flange 206 can engage with at least one mating structure on the target side flange 116 to mate the proton beam degrader 100 with the cooling assembly 200. For example, the one or more holes 210 on the degrader side flange 206 can align with the one or more holes 122 on the target side flange 116. Fasteners can be inserted through these holes to secure the degrader side flange 206 with the target side flange 116.

At least the inner surface 204 of the sleeve 202 and the outer surface 114 of the conduit 102 of the proton beam degrader 100 can define a cooling channel 306. As an example, as shown in FIG. 3D, portions of the inner surface 204 of the sleeve 202, the outer surface 114 of the conduit 102, the target side flange 116 and the beam source side flange 126 define the cooling channel 306. The cooling channel 306 can be annular in structure and can surround the fins 124 and can provide a channel for a coolant fluid to circulate around the fins 124. The, at least one coolant outlet 224 can be fluid communication with the cooling channel 306 through the inner coolant outlet opening 232, while the at least one coolant inlet 222 can be in fluid communication with the cooling channel 306 through the inner coolant inlet opening 228. As shown in FIG. 3A, the at least one coolant inlet 222 and the at least one coolant outlet 224 can be positioned opposite the expected position of the fins 124. In other words, at least one of the at least one coolant inlet 222 and the at least one coolant outlet 224 can be positioned adjacent the fins 124 along a longitudinal axis 240 of the sleeve 202. In particular, at least one of the inner coolant inlet opening 228 and the inner coolant outlet opening 232 on the inner surface 204 of the sleeve 202 can be positioned to be across from at least one fin of the fins 224. In some examples, the center of at least one of the inner coolant inlet opening 228 and the inner coolant outlet opening 232 can be across from the center of the span or the length of the fins 124 measured along the longitudinal axis 130 of the conduit 102.

When in operation, the particle beam can enter the proton beam degrader assembly 300 through the connecting nozzle 236, pass through the degrader foil 110 and exit through the second opening 106 in the proton beam degrader 100. The cooling fluid can be introduced into the cooling channel 306 through the coolant inlet connector 302 and the inner coolant inlet opening 228. The cooling fluid can circulate within the cooling channel 306 and exit the cooling channel through the inner coolant outlet opening 232 and the coolant outlet connector 304. Within the cooling channel 306, the cooling fluid can absorb heat from the surfaces of the proton beam degrader 100 exposed within the cooling chamber 306, which surfaces can include the fins 124 and the outer surface 114 of the conduit 102. The absorbed heat is transferred out of the proton beam degrader assembly 300 by the cooling fluid. Colder cooling fluid is circulated into the cooling channel 306 to continue providing heat transfer. Also, during operation, a target housing including the target material can be coupled with the proton beam degrader assembly 300 at the second opening 106, and a particle beam source outlet is coupled with the connecting nozzle 236. The space between the target and the beam particle beam source can be maintained in a vacuum. As mentioned above, the aperture 112 in the degrader foil 110 ensures that the vacuum is maintained on both sides of the degrader foil 110 by allowing fluid communication therethrough. This vacuum condition can aid the cyclotron in accelerating the proton particles towards the target.

Figure 4A:
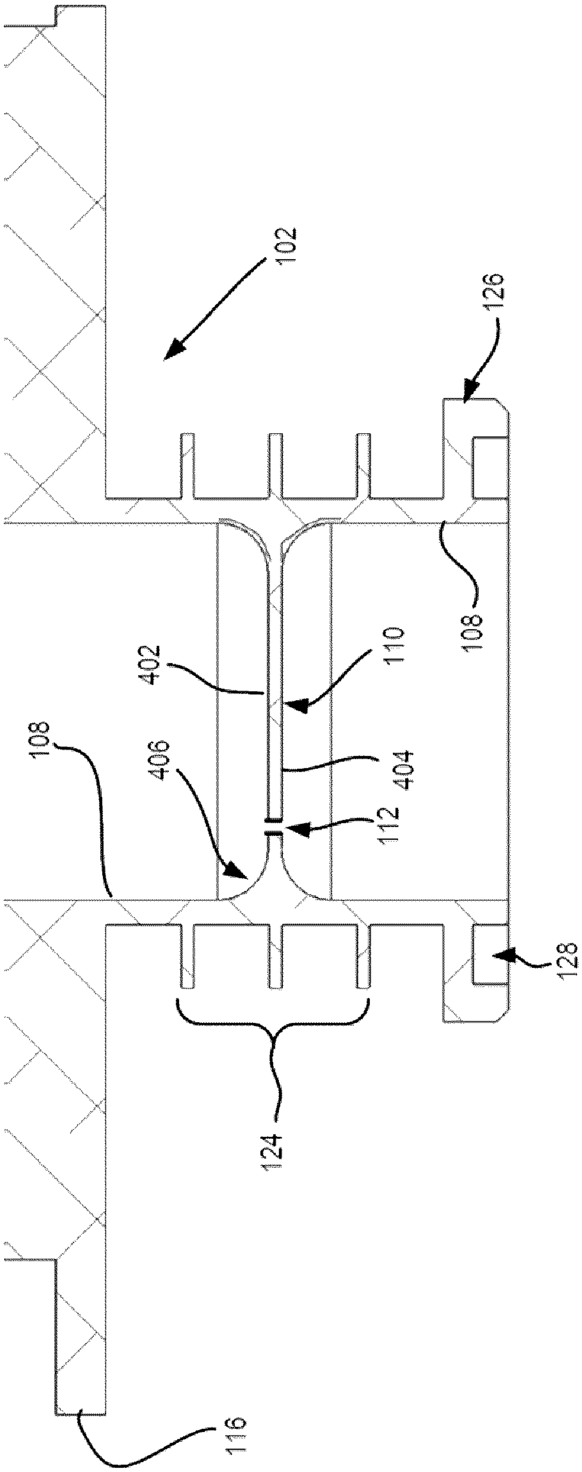
FIGS. 4A-4D show a portion of the proton beam degrader shown in FIG. 1A focusing on transition surfaces associated with a degrader foil.

FIG. 4A shows a portion of the proton beam degrader 100 shown in FIG. 1A. More specifically, FIG. 4A shows an expanded view of the intersection between the degrader foil 110 and the internal surface 108 of the conduit 102. The degrader foil 110 has a target-side surface 402 and a beam-side surface 404. Transition surfaces 406 form a transition between the target-side surface 402 and the internal surface 108 as well as between the beam-side surface 404 and the internal surface 108. In other words, the transition surface 406 is positioned at the corner of at least one intersection of at least one surface of the degrader foil and the internal surface 108. The transition surface 406 can be a chamfered surface, or the corner between the degrader foil 110 and the internal surface can be chamfered. Here chamfered corner or chamfered surface can refer to a flat or a curved surface. For example, FIG. 4B shows a single flat surface 408 as a transition surface between the target-side surface 402 and the internal surface 108. The angle the transition surface 408 makes with each of the target-side surface 402 and the internal surface 108 can be equal (e.g., equal to 45 degrees) or unequal (e.g., 60 degrees and 30 degrees, 30 degrees and 60 degrees, or any two numbers that add to about 90 degrees). FIG. 4C shows another example of a chamfered surface that forms a transition surface between the target-side surface 402 and internal surface 108. Here the chamfered transition surface includes two angled flat surfaces: a first flat transition surface 410 and a second flat transition surface 412. The first flat transition surface 410 is positioned between the internal surface 108 and the second flat transition surface 412, and the second flat transition surface 412 is positioned between the first flat transition surface 410 and the target-side surface 402. While FIG. 4C shows the chamfered transition surface having two flat transition surfaces, more than two flat transition surfaces. In some examples, the flat transition surfaces can be replaced by curved transition surfaces of various radii.

Figure 4D:
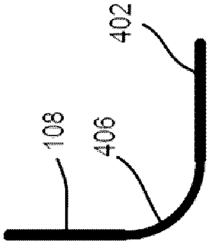
Figure 4C:
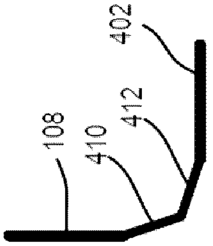
Figure 4B:
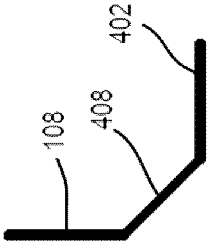
Figure 5:
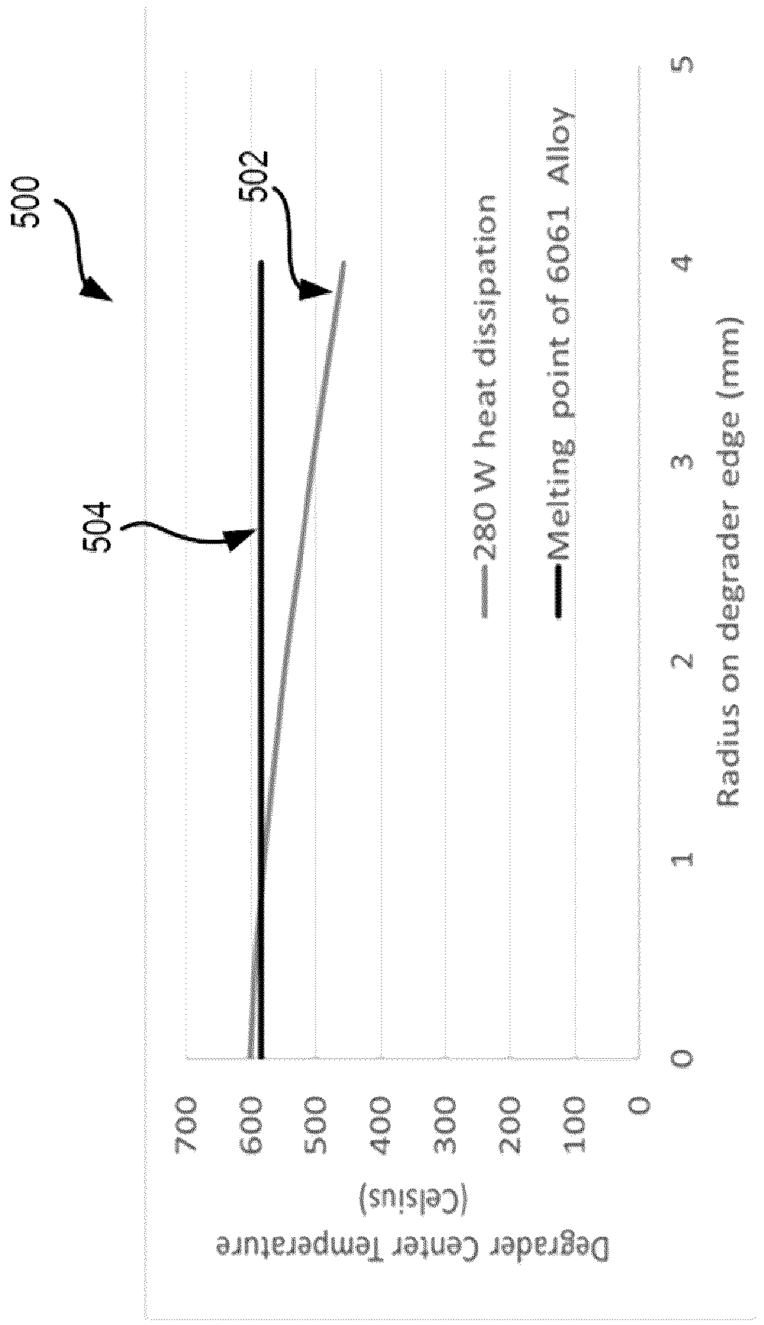
FIG. 5 shows an example graph of a relationship between a temperature at the center of the degrader foil and the radius of a transition surface between the degrader foil and an internal surface 108 of the proton beam degrader.
Figure 6C:
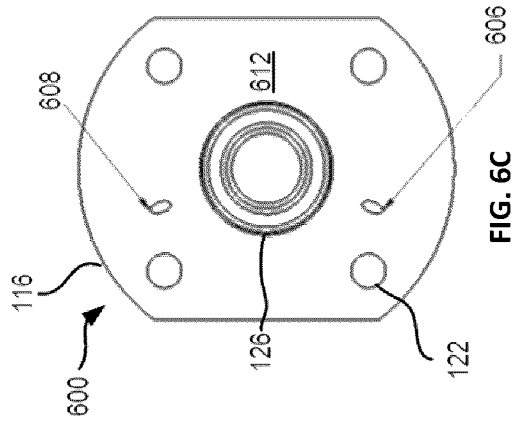
FIGS. 6A-6F show various views of a second proton beam degrader.
Figure 6B:
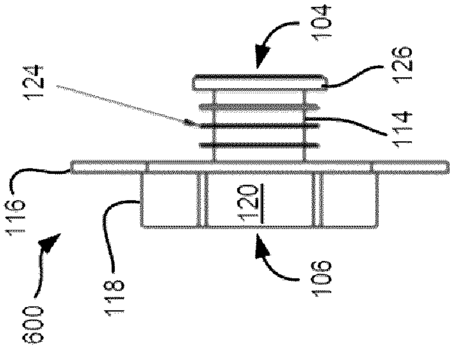
Figure 6A:
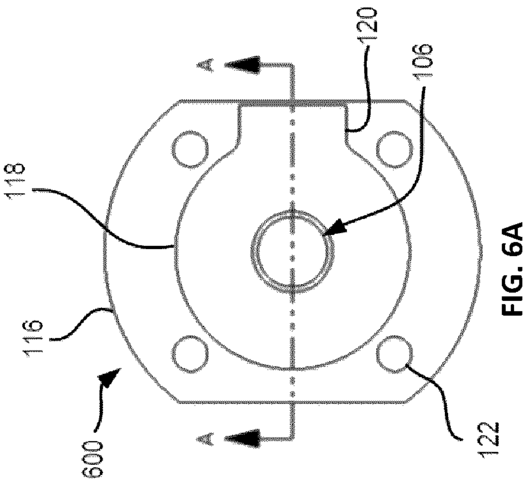
Figure 6F:
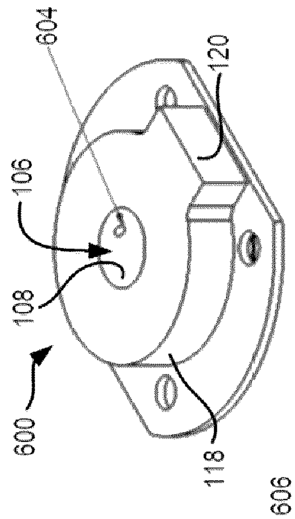
Figure 6E:
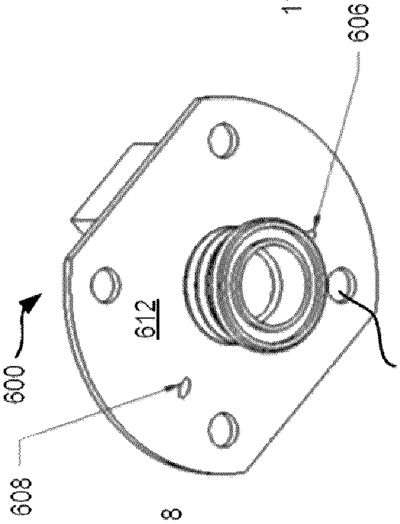
Figure 6D:
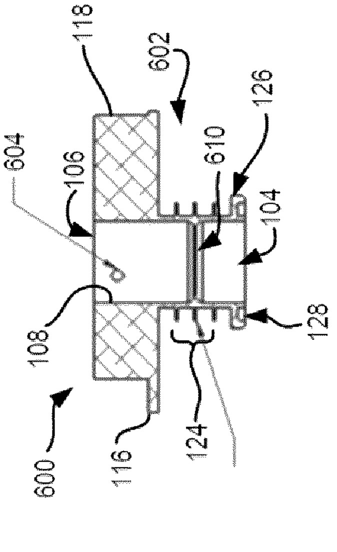
Figure 7A:
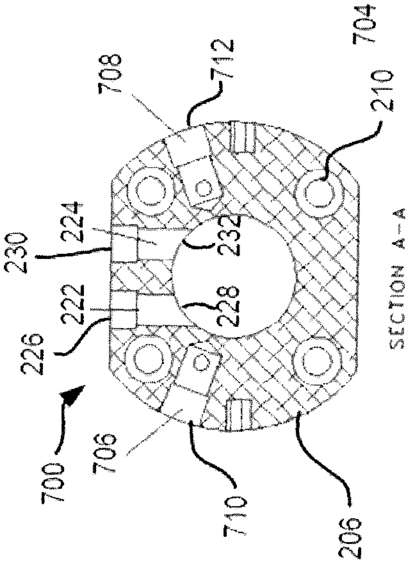
FIGS. 7A-7E show various views of a second cooling assembly.
Figure 7B:
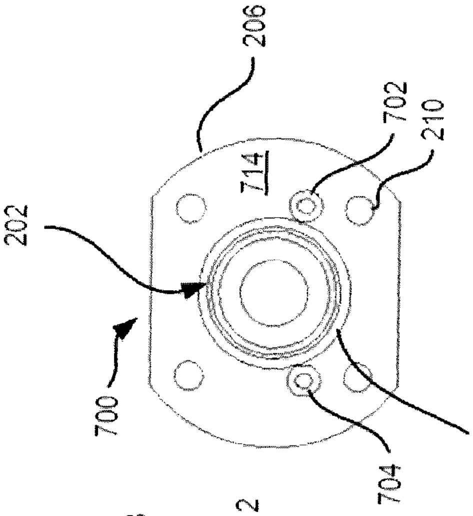
Figure 7C:
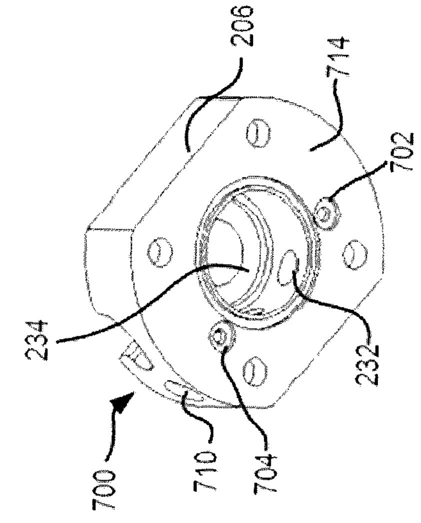
Figure 7D:
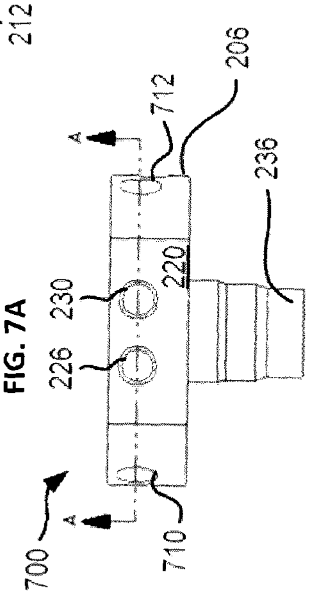
Figure 7E:
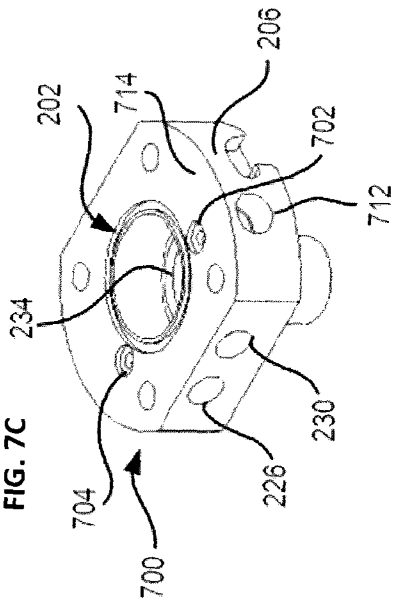

The chamfered transition surfaces shown in FIGS. 4A-4D can provide improved heat conduction between the degrader foil 110 and the remainder of the conduit 102, in particular the fins 124. The improvement in heat conduction improves the rate at which heat energy is transferred away from the degrader foil 110. This causes the degrader foil 110 to remain at temperatures that are below the melting point of the material forming the degrader foil (and the remainder of the conduit 102). FIG. 5 shows an example graph 500 of a relationship between a temperature at the center of the degrader foil and the radius of the chamfered edge between the degrader foil 110 and the internal surface 108 of the conduit 102. The graph 500 is plotted with temperature at the center of the degrader foil 110 on the y-axis and the radius of the chamfered transition surface (e.g., as shown in FIG. 4D) between the degrader foil 110 and the internal surface 108 on the x-axis. The graph 500 has been plotted from simulating the heat transfer characteristics of the proton beam degrader 100 for various radii of the chamfered transition surface. The simulation assumes that an example aluminum (specifically, alloy 6061) material used to form the proton beam degrader 100. The melting point curve 504 indicates the melting point of the material and the temperature curve 502 indicates the temperature at the center of the degrader foil 110, where the particle beam is incident, with increasing radius of the chamfered transition surfaces between the degrader foil 110 and the internal surface 108 of the conduit 102. As the radius of the chamfered transition surfaces increases, the temperature at the center of the degrader foil 110 decreases. Even a 1 mm radius results in the temperature being below the melting point of the material. Further increase in the radius causes the temperature to reduce even further. By reducing the temperature at the center of the degrader foil 110, the reliability and the life of the degrader foil 110 can be increased.

In some instances, a target may not perform as desired under vacuum. For example, zinc may sublimate under vacuum. Therefore, zinc may not be used as a target in conjunction with the proton beam degrader assembly 300, which maintains a vacuum over the target. In such instances, where a target is not compatible with vacuum conditions, the target can be operated under fluid pressure, where the fluid can be an inert fluid such as, for example, helium, argon, hydrogen, or other inert or noble gases. To allow the target to operate under fluid pressure, the proton beam degrader 100 can be modified to accommodate the insertion of gas within the region surrounding the target. In one approach, discussed below, the degrader foil 110 can be without any apertures and the proton beam degrader 100 can include channels to communicate inert fluid into and out of the portion of the proton beam degrader 100 adjacent to the target. The cooling assembly 200 can be accordingly modified to allow for the communication of the inert fluid into and out of the proton beam degrader 100.

FIGS. 6A-6F show various views of a second proton beam degrader 600. The second proton beam degrader is similar to the first proton beam degrader 100 discussed above in relation to FIGS. 1A-5. However, unlike the first proton beam degrader 100, which includes one or more apertures 112 in the degrader foil 110, the degrader foil 610 in the second proton beam degrader 600 does not include any apertures. Moreover, the second proton beam degrader 600 includes a channel that allows fluid communication between a first channel opening on the internal surface 108 of the conduit 102 and a second channel opening on the target side flange 116. Similar elements between the first proton beam degrader 100 and the second proton beam degrader 600 have like reference numerals.

Referring to FIGS. 6A-6D, the second proton beam degrader 600 includes a first channel opening 604 on the internal surface 108 of the conduit 602 and a second channel opening 608 on the beam-side surface 612 of the target side flange 116. The second proton beam degrader 600 also incudes a third channel opening (not shown) in the internal surface 108 of the conduit 602 and a fourth channel opening 606 on the beam-side surface 612 of the target side flange 116. A first inert fluid inlet channel extends between the first channel opening 604 and the second channel opening 608, and a first inert fluid outlet channel extends between the third channel opening and the fourth channel opening 606. The first channel opening 604 and the third channel opening formed on the internal surface 108 can be positioned between the degrader foil 610 and the second opening 106. In other words, with reference to the direction of the particle beam through the conduit 602, the first channel opening 604 and the second channel opening can be positioned downstream of the degrader foil 610 and the target side flange 116, and upstream of the second opening 106. The first inert fluid inlet channel and the first inert fluid outlet channel extend through the target side flange 116 and the key structure 118. In some implementations, where the conduit 602 may not include the key structure 118, the two inert fluid channels can be formed in the target side flange 116. In such instances, the first channel opening 604 and the second channel opening can be positioned between the degrader foil 610 and the target side flange 116. The diameter of the first channel opening 604 can be between about 1 mm and about 10 mm. The first channel opening 604 and the second channel opening can provide an inlet and an outlet for an inert fluid that can be maintained within a cavity defined by the target surface, the internal surface 108 of the conduit 602 and the surface of the degrader foil 610 facing the target. The fourth channel opening 606 and the second channel opening 608 formed on the beam-side surface 612 of the target side flange 116 can be positioned on opposite sides of the conduit 602. However, this is only an example, and the fourth channel opening 606 and the second channel opening 608 can be positioned anywhere on the beam-side surface 612 of the target side flange 116. The diameter of the second channel opening 608 and the fourth channel opening 606 can be between about 1 mm and about 10 mm.

FIGS. 7A-7E show various views of a second cooling assembly 700. The second cooling assembly 700, in many respects, is similar to the first cooling assembly 200 discussed above in relation to FIGS. 2A-2E and FIGS. 3A-3D. However, the second cooling assembly 700 additionally includes a second inert fluid inlet channel 708 and a second inert fluid outlet channel 706. The second inert fluid inlet channel 708 couples with the first inert fluid inlet channel in the second proton beam degrader 600 and the second inert fluid outlet channel 706 couples with the first inert fluid outlet channel in the second proton beam degrader 600 when the second proton beam degrader 600 is coupled with the second cooling assembly 700. The second inert fluid inlet channel 708 extends between an inner inert fluid inlet opening 702 and an outer inert fluid inlet opening 712, while the second inert fluid outlet channel 706 extends between an inner inert fluid outlet opening 704 and an outer inert fluid outlet opening 710. The inner inert fluid inlet opening 702 and the inner inert fluid outlet opening 704 can be defined by a degrader facing surface 714 of the degrader side flange 206, while the outer inert fluid outlet opening 710 and the outer inert fluid inlet opening 712 can be defined by the at least one side surface 220 of the degrader side flange 206. The inner inert fluid inlet opening 702 and the inner inert fluid outlet opening 704 can be slotted openings to provide room to accommodate a washer or an O-ring. The outer inert fluid outlet opening 710 and the outer inert fluid inlet opening 712 are positioned on either side of the outer coolant inlet opening 226 and the outer coolant outlet opening 230. However, this is only an example, and the outer inert fluid outlet opening 710 and the outer inert fluid inlet opening 712 can be positioned anywhere on the at least one side surface 220 of the degrader side flange 206. The diameter of the outer inert fluid outlet opening 710 and the outer inert fluid inlet opening 712 can have values in the range of about 5 mm to about 15 mm. The diameters of the inner inert fluid inlet opening 702 and the 704 can have values in the range of about 1 mm to about 10 mm.

Figure 8:
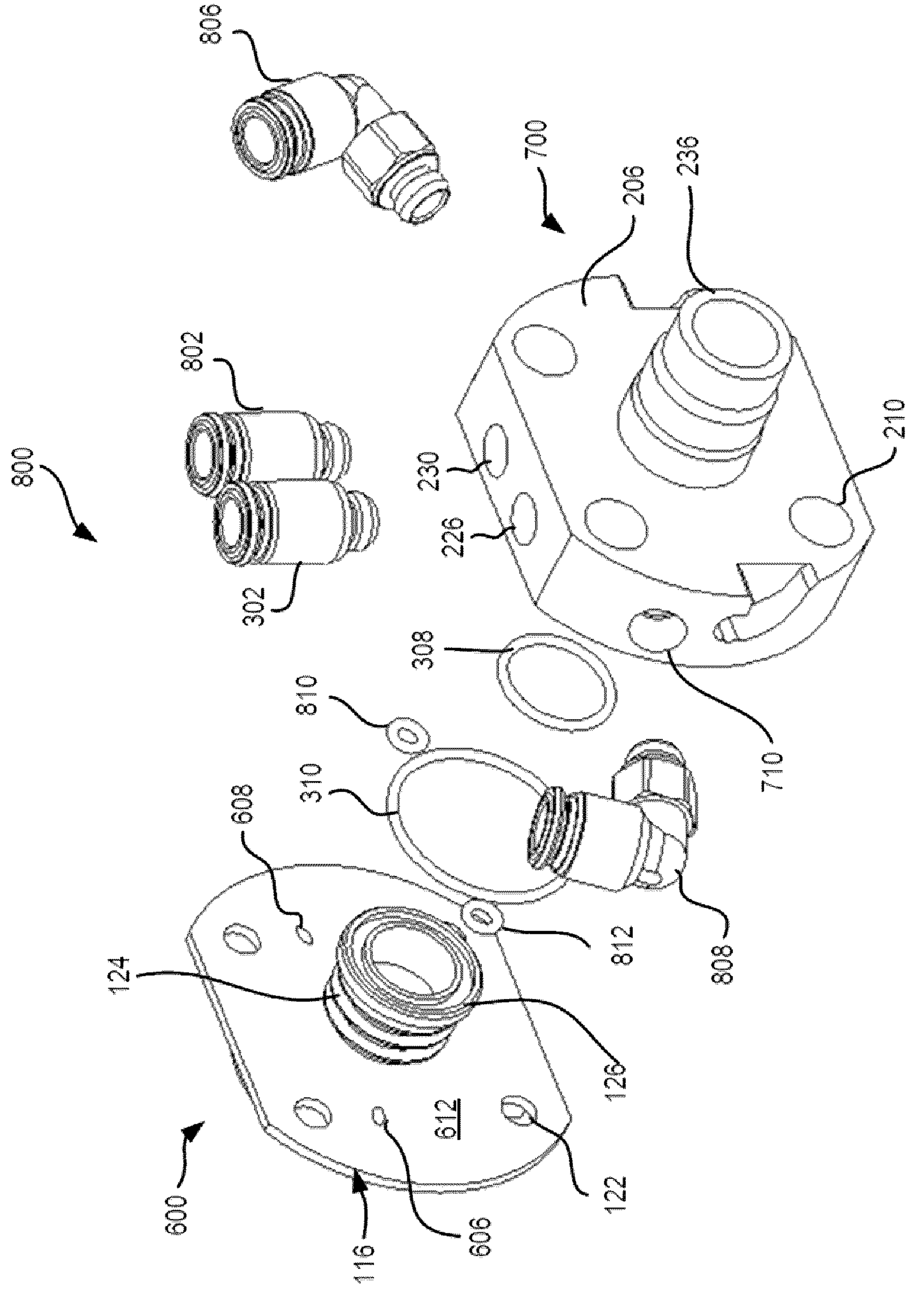
FIG. 8 shows an exploded view of a proton beam degrader assembly including the second proton beam degrader and the second cooling assembly.

FIG. 8 shows an exploded view of a proton beam degrader assembly 800 including the second proton beam degrader 600 and the second cooling assembly 700. When the second proton beam degrader 600 and the second cooling assembly 700 are coupled with each other, the beam-side surface 612 of the target side flange 116 is positioned against the degrader side surface 714 (FIGS. 7A-7E) of the degrader side flange 206. The second channel opening 608 to the first inert fluid inlet channel in the target side flange 116 of the second proton beam degrader 600 is positioned to align with the inner inert fluid inlet opening 702 to the second inert fluid inlet channel 708 in the degrader side flange 206 of the second cooling assembly 700. As a result, there is fluid communication between the first inert fluid inlet channel and the second inert fluid inlet channel 708. An inert fluid inlet O-ring 810 can be positioned a slot around the inner inert fluid inlet opening 702 to form a seal between the inner inert fluid inlet opening 702 and the second channel opening 608. Similarly, the fourth channel opening 606 to the first inert fluid outlet channel in the target side flange 116 of the second proton beam degrader 600 is positioned to align with the inner inert fluid outlet opening 704 to the second inert fluid outlet channel 706 in the degrader side flange 206 of the second cooling assembly 700. As a result, there is fluid communication between the first inert fluid outlet channel and the second inert fluid outlet channel 706. An inert fluid outlet O-ring 812 can be positioned in a slot around the inner inert fluid outlet opening 704 to form a seal between the inner inert fluid outlet opening 704 and the fourth channel opening 606.

The coolant inlet connector 302 can be coupled with the outer coolant inlet opening 226 and a coolant outlet connector 802 can be coupled with the outer coolant outlet opening 230. The coolant inlet connector 302 and the coolant outlet connector 802 can be connected to a cooling fluid circuit that circulates the cooling fluid into the proton beam degrader assembly 800. An inert fluid inlet connector 806 can be coupled with the outer inert fluid inlet opening 712 while an inert fluid outlet connector 808 can be couple with the outer inert fluid outlet opening 710. The inert fluid inlet connector 806 and the inert fluid outlet connector 808 can be connected to an inert fluid circuit that circulates the inert fluid into the cavity defined by the target surface, the internal surface 108 of the conduit 602 and the surface of the degrader foil 610 facing the target.

When in operation, the particle beam can enter the proton beam degrader assembly 800 via the connecting nozzle 236, pass through the degrader foil 610 and strike the target (not shown). The cooling fluid can be circulated into the proton beam degrader assembly 800 via the coolant inlet connector 302 and the coolant outlet connector 802. The cooling fluid can provide cooling to the degrader foil 610. In addition, an inert fluid can be circulated into the cavity defined by the target surface, the internal surface 108 of the conduit 602 and the surface of the degrader foil 610 facing the target via the inert fluid inlet connector 806 and the inert fluid outlet connector 808. The inert fluid can provide the desired pressure and conditions for the target. In addition, the inert fluid can provide additional cooling to the degrader foil 610. As a result, the degrader foil 610 is cooled by the cooling fluid as well as the inert fluid, thereby improving the reliability and the life of the degrader foil 610.

Aspects. The following listing of exemplary aspects supports and is supported by the disclosure provided herein.

Aspect 1. A proton beam degrader for positioning between a particle beam source and a target material, comprising: a conduit having a first opening and a second opening, the conduit providing a path for a particle beam to enter through the first opening and exit through the second opening; a degrader foil positioned on the inner surface of the conduit and in an expected path of the particle beam, the degrader being structurally integral to the conduit; at least one chamfered corner at least one intersection of a surface of the degrader foil and the inner surface of the conduit.

Aspect 2. The proton beam degrader of Aspect 1, further comprising: a plurality of fins extending outwards from the outer surface of the conduit, the plurality of fins positioned opposed to the position of the degrader foil.

Aspect 3. The proton beam degrader of any one of Aspects 1 and 2, wherein the degrader foil includes at least one aperture providing fluid communication through the degrader foil.

Aspect 4. The proton beam degrader of Aspect 3, wherein the at least one aperture is positioned away from a center of the degrader foil.

Aspect 5. The proton beam degrader of Aspect 4, wherein the at least one aperture is positioned outside of a region on the degrader foil where the particle beam is expected to be incident.

Aspect 6. The proton beam degrader of any one of the Aspects 1-4, wherein the at least one aperture has a diameter between about 0.1 mm and about 3 mm.

Aspect 7. The proton beam degrader of any one of the Aspects 1-5, wherein the conduit and the degrader foil are formed of at least one of aluminum, tantalum, niobium, carbon, molybdenum, or a refractory material.

Aspect 8. The proton beam degrader of any one of the Aspects 1-7, wherein a thickness of the degrader foil degrades an energy of an incident proton beam to 13 MeV or less.

Aspect 9. The proton beam degrader of any one of the Aspects 1-8, wherein the degrader foil is positioned substantially normal to a direction of the particle beam.

Aspect 10. The proton beam degrader of any one of Aspects 1-9, further comprising: a target side flange extending outwards from the outer surface of the conduit proximate the second opening, the target side flange including at least one coupling structure configured to couple the target side flange to a support structure.

Aspect 11. The proton beam degrader of any one of Aspect 1-2, further comprising: a target side flange extending outwards from the outer surface of the conduit proximate the second opening; a first channel opening on the inner surface of the conduit positioned between the second opening and the degrader foil; a second channel opening on a surface of the target side flange; and a channel that extends between the first channel opening and the second channel opening, the channel providing fluid communication between the first channel opening and the second channel opening.

Aspect 12. The proton beam degrader of any one of Aspects 1-11, further comprising: a beam source side flange extending outwards from the outer surface of the conduit proximate the second opening, the beam source flange including a recess to accommodate an O-ring.

Aspect 13. The proton beam degrader of any one of Aspects 1-12, wherein at least one fin of the plurality of fins is positioned on either side of the degrader foil along a longitudinal axis of the conduit.

Aspect 14. The proton beam degrader of any one of Aspects 1-13, further comprising a beam source side flange that extends outwardly from the outer surface of the conduit, wherein the plurality of fins are positioned between the target side flange and the beam source side flange.

Aspect 15. The proton beam degrader of any one of Aspects 1-14, wherein the chamfered corner includes a at least one surface that is flat or curved that extend between a surface of the degrader foil and the internal surface of the conduit.

Aspect 16. The proton beam degrader of any one of the Aspects 1, 13, and 14, wherein the plurality of fins are shaped to induce turbulence in a cooling fluid flowing over the plurality of fins.

Aspect 17. A proton beam degrader for positioning between a particle beam source and a target material, comprising: a conduit having a first opening and a second opening, the conduit providing a path for a particle beam to enter through the first opening and exit through the second opening; a degrader foil structurally integral to the conduit positioned on the inner surface of the conduit and in an expected path of the particle beam; and a cooling path zone on an outer surface of the conduit, the cooling path zone configured to exposed to a coolant fluid.

Aspect 18. The proton beam degrader of Aspect 17, further comprising: at least one chamfered corner at least one intersection of a surface of the degrader foil and the inner surface of the conduit.

Aspect 19. The proton beam degrader of any one of Aspects 17 and 18, further comprising: a plurality of fins that extend outwardly from the outer surface of the conduit and within the cooling path zone.

Aspect 20. The proton beam degrader of any one of Aspects 17-19, wherein the degrader foil includes at least one aperture providing fluid communication through the degrader foil.

Aspect 21. The proton beam degrader of Aspect 20, wherein the at least one aperture is positioned away from a center of the degrader foil.

Aspect 22. The proton beam degrader of Aspect 21, wherein the at least one aperture is positioned outside of a region on the degrader foil where the particle beam is expected to be incident.

Aspect 23. The proton beam degrader of Aspect any one of the Aspects 17-21, wherein the at least one aperture has a diameter between 0.1 mm and 3 mm.

Aspect 24. The proton beam degrader of any one of the Aspects 17-23, wherein the conduit and the degrader foil are formed of at least one of aluminum, tantalum, niobium, carbon, molybdenum, or a refractory material.

Aspect 25. The proton beam degrader of any one of the Aspects 17-24, wherein a thickness of the degrader foil has a value between 0.1 mm and 2.2 mm.

Aspect 26. The proton beam degrader of any one of the Aspects 17-25, wherein the degrader foil is positioned substantially normal to a direction of the particle beam.

Aspect 27. The proton beam degrader of any one of Aspects 17-26, further comprising: a target side flange extending outwards from the outer surface of the conduit proximate the second opening, and at least one key structure configured to couple the target side flange to a target housing.

Aspect 28. The proton beam degrader of any one of Aspect 17-19, further comprising: a target side flange extending outwards from the outer surface of the conduit proximate the second opening; a first channel opening on the inner surface of the conduit positioned between the second opening and the degrader foil; a second channel opening on a surface of the target side flange; and a channel that extends between the first channel opening and the second channel opening, the channel providing fluid communication between the first channel opening and the second channel opening.

Aspect 29. The proton beam degrader of any one of Aspects 17-28, further comprising: a beam source side flange extending outwards from the outer surface of the conduit proximate the first opening, the beam source flange including a recess to accommodate an o-ring.

Aspect 30. The proton beam degrader of any one of Aspects 17-29, wherein at least one fin of the plurality of fins is positioned on either side of the degrader foil along a longitudinal axis of the conduit.

Aspect 31. The proton beam degrader of any one of Aspects 17-30, further comprising a beam source side flange that extends outwardly from the outer surface of the conduit, wherein the plurality of fins are positioned between the target side flange and the beam source side flange.

Aspect 32. The proton beam degrader of any one of the Aspects 30 and 31, wherein the plurality of fins are shaped to induce turbulence in a cooling fluid flowing over the plurality of fins.

Aspect 33. A proton beam degrader assembly for positioning between a particle beam source and a target material, comprising: a proton beam degrader, comprising: a conduit having a first opening and a second opening, the conduit providing a path for a particle beam to enter through the first opening and exit through the second opening; a degrader foil structurally integral to the conduit positioned on the inner surface of the conduit and in an expected path of the particle beam; and a plurality of fins extending outwards from the outer surface of the conduit, the plurality of fins positioned opposed to the position of the degrader foil; a cooling assembly, comprising: a sleeve having an inner surface enclosing the plurality of fins of the proton beam degrader, wherein at least the inner surface of the sleeve and the outer surface of the conduit of the proton beam degrader define a cooling channel; a coolant inlet in fluid communication with the cooling channel, and a coolant outlet in fluid communication with the cooling channel.

Aspect 34. The proton beam degrader assembly of Aspect 33, the proton beam degrader comprising: a target side flange extending outwards from the outer surface of the conduit proximate the second opening, the target side flange including at least one mating structure; the cooling assembly, comprising: a degrader side flange that extends outwardly from a degrader side end of the sleeve, the degrader side flange including at least one mating structure engaging with the at least one mating structure of the target side flange to mate the proton beam degrader with the cooling assembly.

Aspect 35. The proton beam degrader assembly of Aspect 34, wherein the degrader side flange includes a first recess to accommodate a first o-ring, the degrader side flange in contact with the target side flange over the first recess.

Aspect 36. The proton beam degrader assembly of any one of Aspects 33-35, the proton beam degrader comprising: a sleeve side flange that extends outwardly from the outer surface of the conduit proximate the first opening, the sleeve side flange including a second recess to accommodate a second o-ring; the cooling assembly comprising: a lip that extends inwardly from the inner surface of the sleeve and in contact with the sleeve side flange over the second recess.

Aspect 37. The proton beam degrader assembly of any one of Aspects 33-36, wherein the coolant inlet and the coolant outlet are positioned adjacent the plurality of fins along a longitudinal axis of the sleeve.

Aspect 38. The proton beam degrader assembly of any one of Aspects 33-35, the proton beam degrader comprising: a first channel opening on the inner surface of the conduit positioned between the second opening and the degrader foil; a second channel opening on a surface of the target side flange; and a channel extending between the first channel opening and the second channel opening, the channel providing fluid communication between the first channel opening and the second channel opening; the cooling assembly comprising: a third channel opening on a surface of the degrader side flange, the third channel opening aligned with the second channel opening on the surface of the target side flange.

Aspect 39. The proton beam degrader assembly of any one of Aspects 33-38, the proton beam degrader comprising: at least one chamfered corner at least one intersection of a surface of the degrader foil and the inner surface of the conduit.

Aspect 40. The proton beam degrader assembly of any one of the Aspects 33 and 37, wherein the plurality of fins are shaped to induce turbulence in a cooling fluid flowing over the plurality of fins.

Aspect 41. The proton beam degrader assembly of any one of Aspects 33-40, wherein the degrader foil includes at least one aperture providing fluid communication through the degrader foil.

Aspect 42. A system for producing medically useful radioisotopes, the system comprising: a cyclotron, wherein the cyclotron is capable of providing a proton energy beam; a target with an isotope capable of conversion to a radioisotope upon irradiation with a proton energy beam of suitable energy; and the proton beam degrader of any one of Aspects 17-32; and/or the proton beam degrader of any one of Aspects 1-16.

Aspect 43. A system for producing medically useful radioisotopes, the system comprising: a cyclotron, wherein the cyclotron is capable of providing a proton energy beam; a target with an isotope capable of conversion to a radioisotope upon irradiation with a proton energy beam of suitable energy; and the proton beam degrader assembly of any one of Aspects 33-41.

Aspect 44. A process for producing medically useful radioisotopes, the process comprising: directing a proton energy beam through a proton energy degrader at a target; wherein the target comprises an isotope capable of conversion to a radioisotope upon irradiation with the proton energy beam; wherein the proton beam degrader is the proton beam degrader of any one of Aspects 17-32; and/or wherein the proton beam degrader is the proton beam degrader of any one of Aspects 1-5.

Aspect 45. A process for producing medically useful radioisotopes, the process comprising: directing a proton energy beam through a proton beam degrader assembly at a target; wherein the target comprises an isotope capable of conversion to a radioisotope upon irradiation with the proton energy beam; wherein the proton beam degrader is the proton beam degrader of any one of Aspects 17-32; and/or wherein the proton beam degrader assembly is the proton beam degrader assembly of any one of Aspects 33-41.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only and is not intended to be limiting. The skilled artisan will recognize many variants and adaptations of the aspects described herein. These variants and adaptations are intended to be included in the teachings of this disclosure and to be encompassed by the claims herein.

What is claimed is:

1. A proton beam degrader for positioning between a particle beam source and a target material, comprising:

a conduit having a first opening and a second opening, the conduit providing a path for a particle beam to enter through the first opening and exit through the second opening;

a degrader foil positioned on the inner surface of the conduit and in an expected path of the particle beam, the degrader foil being structurally integral to the conduit;

at least one chamfered corner located at the position of at least one intersection of a surface of the degrader foil and the inner surface of the conduit;

wherein the degrader foil includes at least one aperture providing fluid communication through the degrader foil.

2. The proton beam degrader of claim 1, further comprising:

a plurality of fins extending outwards from the outer surface of the conduit, the plurality of fins positioned opposed to the position of the degrader foil.

3. The proton beam degrader of claim 1, wherein the at least one aperture is positioned away from a center of the degrader foil.

4. The proton beam degrader of claim 3, wherein the at least one aperture is positioned outside of a region on the degrader foil where the particle beam is expected to be incident.

5. The proton beam degrader of claim 1, wherein the at least one aperture has a diameter between about 0.1 mm and about 3 mm.

6. The proton beam degrader of claim 1, wherein the conduit and the degrader foil are formed of at least one of aluminum, tantalum, niobium, carbon, molybdenum, or a refractory material.

7. The proton beam degrader of claim 1, wherein a thickness of the degrader foil degrades an energy of an incident proton beam to 13 MeV or less.

8. The proton beam degrader of claim 1, wherein the degrader foil is positioned substantially normal to a direction of the particle beam.

9. The proton beam degrader of claim 1, further comprising:

a target side flange extending outwards from the outer surface of the conduit proximate the second opening, the target side flange including at least one coupling structure configured to couple the target side flange to a support structure.

10. The proton beam degrader of claim 1, further comprising:

a target side flange extending outwards from the outer surface of the conduit proximate the second opening;

a first channel opening on the inner surface of the conduit positioned between the second opening and the degrader foil;

a second channel opening on a surface of the target side flange; and a channel that extends between the first channel opening and the second channel opening, the channel providing fluid communication between the first channel opening and the second channel opening.

11. The proton beam degrader of claim 10, further comprising: a plurality of fins extending outwards from the outer surface of the conduit, the plurality of fins positioned opposed to the position of the degrader foil; and a beam source side flange that extends outwardly from the outer surface of the conduit, wherein the plurality of fins are positioned between the target side flange and the beam source side flange.

12. The proton beam degrader of claim 1, further comprising:

a beam source side flange extending outwards from the outer surface of the conduit proximate the second opening, the beam source side flange including a recess to accommodate an O-ring.

13. The proton beam degrader of claim 2, wherein at least one fin of the plurality of fins is positioned on either side of the degrader foil along a longitudinal axis of the conduit.

14. The proton beam degrader of claim 2, wherein the at least one chamfered corner includes a at least one surface that is flat or curved that extend between a surface of the degrader foil and the inner surface of the conduit.

15. The proton beam degrader of claim 2, wherein the plurality of fins are shaped to induce turbulence in a cooling fluid flowing over the plurality of fins.

16. A system for producing medically useful radioisotopes, the system comprising:

a cyclotron, wherein the cyclotron is capable of providing a proton energy beam;

a target with an isotope capable of conversion to a radioisotope upon irradiation with a proton energy beam of suitable energy; and the proton beam degrader of claim 1.

17. A process for producing medically useful radioisotopes, the process comprising: directing a proton energy beam through a proton energy degrader at a target;

wherein the target comprises an isotope capable of conversion to a radioisotope upon irradiation with the proton energy beam;

wherein the proton beam degrader is the proton beam degrader of claim 1.

18. A process for producing medically useful radioisotopes, the process comprising: directing a proton energy beam through a proton beam degrader assembly at a target;

wherein the target comprises an isotope capable of conversion to a radioisotope upon irradiation with the proton energy beam;

wherein the proton beam degrader is the proton beam degrader of claim 1.

19. A proton beam degrader assembly for positioning between a particle beam source and a target material, comprising:

a proton beam degrader, comprising:

a conduit having a first opening and a second opening, the conduit providing a path for a particle beam to enter through the first opening and exit through the second opening;

a degrader foil structurally integral to the conduit positioned on the inner surface of the conduit and in an expected path of the particle beam; and a plurality of fins extending outwards from the outer surface of the conduit, the plurality of fins positioned opposed to the position of the degrader foil;

a cooling assembly, comprising:

a sleeve having an inner surface enclosing the plurality of fins of the proton beam degrader, wherein at least the inner surface of the sleeve and the outer surface of the conduit of the proton beam degrader define a cooling channel;

a coolant inlet in fluid communication with the cooling channel; and a coolant outlet in fluid communication with the cooling channel.

20. The proton beam degrader assembly of claim 19, the proton beam degrader comprising:

a target side flange extending outwards from the outer surface of the conduit proximate the second opening, the target side flange including at least one mating structure;

the cooling assembly, comprising:

a degrader side flange that extends outwardly from a degrader side end of the sleeve, the degrader side flange including at least one mating structure engaging with the at least one mating structure of the target side flange to mate the proton beam degrader with the cooling assembly.

21. The proton beam degrader assembly of claim 20, wherein the degrader side flange includes a first recess to accommodate a first o-ring, the degrader side flange in contact with the target side flange over the first recess.

22. The proton beam degrader assembly of claim 19, the proton beam degrader comprising:

a sleeve side flange that extends outwardly from the outer surface of the conduit proximate the first opening, the sleeve side flange including a second recess to accommodate a second o-ring;

the cooling assembly comprising:

a lip that extends inwardly from the inner surface of the sleeve and in contact with the sleeve side flange over the second recess.

23. The proton beam degrader assembly of claim 19, wherein the coolant inlet and the coolant outlet are positioned adjacent the plurality of fins along a longitudinal axis of the sleeve.

24. The proton beam degrader assembly of claim 20, the proton beam degrader comprising:

a first channel opening on the inner surface of the conduit positioned between the second opening and the degrader foil;

a second channel opening on a surface of the target side flange; and a channel extending between the first channel opening and the second channel opening, the channel providing fluid communication between the first channel opening and the second channel opening;

the cooling assembly comprising:

a third channel opening on a surface of the degrader side flange, the third channel opening aligned with the second channel opening on the surface of the target side flange.

25. The proton beam degrader assembly of claim 19, the proton beam degrader comprising:

at least one chamfered corner at least one intersection of a surface of the degrader foil and the inner surface of the conduit.

26. The proton beam degrader assembly of claim 19, wherein the plurality of fins are shaped to induce turbulence in a cooling fluid flowing over the plurality of fins.

27. The proton beam degrader assembly of claim 19, wherein the degrader foil includes at least one aperture providing fluid communication through the degrader foil.

* * * * *